United States Patent Office

3,268,303
Patented August 23, 1966

3,268,303
REMOVAL OF STAINLESS-STEEL CLADDINGS FROM NUCLEAR FUEL ELEMENTS
Devabhaktuni Ramaswami, Westmont, Norman M. Levitz, Bellwood, and Albert A. Jonke, Elmhurst, Ill., assignors to the United States of America as represented by the United States Atomic Energy Commission
No Drawing. Filed Mar. 17, 1964, Ser. No. 352,702
5 Claims. (Cl. 23—324)

The invention described herein was made in the course of, or under, a contract with the United States Atomic Energy Commission.

This invention deals with a process of removing stainless-steel claddings from nuclear fuel elements and in particular from uranium-oxide-base or uranium oxide-cermet-type fuel cores.

In the processing of neutron-bombarded uranium oxide fuel elements for the separation of the various fission products and the regeneration of uranium oxide, the first step usually is the removal of the stainless-steel claddings. For this, reaction with chlorine gas at a temperature of about 600° C. has been tried. However, this process previously used involves corrosion problems, and expensive material has to be used for the equipment in which the process is carried out. It has been tried to attack and dissolve the stainless-steel claddings with a mixture of hydrogen chloride vapor and steam; however, no dissolution of stainless steel took place with it.

It is an object of this invention to provide a process for the dissolution of stainless-steel claddings from fuel elements which can be carried out at low temperatures, so that very little corrosion of the equipment takes place.

It is also an object of this invention to provide a process for the dissolution of stainless-steel claddings from fuel elements which proceeds at a satisfactorily fast rate.

It is finally an object of this invention to provide a process for the dissolution of stainless-steel-clad uranium oxide fuel elements in which the uranium oxide core material is not dissolved to a noticeable degree.

It has been found that, although, as mentioned above, vaporized hydrogen chloride is not operative for the dissolution of stainless steel, atomized aqueous hydrochloric acid, when in liquid form and introduced in a gas-fluidized bed at temperatures below 100° C., attacks stainless steel at a reasonably fast rate without reacting with the uranium oxide core material. If the dissolution is carried out according to this invention, corrosion of the equipment made of customary construction materials is nil or negligibly low. Hastelloy-B, which is an alloy containing from 62.5 to 66.5% nickel, from 26 to 30% molybdenum, from 4 to 7% iron and from 0.04 to 0.15% carbon, was found especially suitable for the equipment.

The concentration of the hydrochloric acid may vary from 3 to 35% by weight. The partial pressure of hydrogen chloride in the gas phase should be above the vapor pressure of the hydrochloric acid, so that the hydrogen chloride concentration in the liquid hydrochloric acid is maintained at as high a level as possible.

As previously mentioned, the reaction is preferably carried out in a fluidized. (A fluidized bed is obtained by passing a gas upwardly through a bed of solid particles at a sufficient velocity to separate the particles from each other and to maintain them out of contact. In this condition a certain degree of freedom to move is imparted to the solid particles so that the solid-gas mixture behaves much like a liquid and has the ability to flow under the influence of a hydrostatic head.)

Inert materials are used for creating the fluidized bed, as is known to those skilled in the art. Sintered granular alumina has been found especially well suitable for the process of this invention. Air is the preferred fluidization gas, which can be enriched in oxygen. The higher the oxygen content the faster dissolution rate was obtained. Pure oxygen yielded the highest dissolution rate, the rate then being about 25% higher than that obtained with air.

The fuel can be either used in the form of full-length bodies as they come out of the reactor, or else they can be cut into sections before introducing them into the inert material of the fuel bed. The flow rate of the liquid hydrochloric acid may vary widely; it may range between 1 foot per second and 100 feet per second. The temperature of reaction may range between room temperature and a temperature close to, but below, 100° C. When the temperatures are so high as to convert all or a greater part of the hydrochloric acid to vapor, the desired dissolution does not take place.

The equipment for the process of this invention is not critical, and any device that has been found suitable for fluidized-bed processes known to those skilled in the art can be used. For the experiments that led to this invention a device was used that comprised a ¾-inch wide, 21-inch long Monel pipe as a reactor in which the disengaging zone was made of a 6-inch long, 1½-inch wide stainless-steel nipple. For introduction of the liquid hydrochloric acid into the fluidized bed, a nickel tube having an inner diameter of ⅛ inch was used. The corrosion specimen was a ½-inch thermowell of 304 stainless steel (18–20% chromium, 8–11% nickel, up to 2% manganese and up to 0.08% carbon) that extended from the top of the disengaging section to within 1.5 inches of the bottom of the bed. The nickel tube for the inlet of the hydrochloric acid and the Monel reactor tube were also used as corrosion specimens for the purpose of comparison.

In the following, a few examples are given for illustrative purposes.

*Example I*

The equipment described above was used for testing the effect of temperature changes and of fluidization on the dissolution rate of stainless steel. The fluidized bed was formed of 150 grams of sintered alumina grains that had a particle size of between −30 and +40 mesh. Hydrochloric acid of a concentration of about 30% by weight was introduced at a rate of 2 to 3 feet per second; the carrier gas for fluidization was air. The bed contained about 10% by weight of aqueous hydrochloric acid. Two parallel runs were carried out, one at 25° C. (room temperature) and one at 60° C. In both instances the corrosion or dissolution was determined that had occurred on the part of the thermowell extending into the fluid-bed zone and on that above the fluid-bed zone. The section immersed in the fluid bed had corroded at an average rate of 1.0 mil per hour at 25° C. and of 8.5 mils per hour at 60° C., while the part beyond the fluidized zone corroded at a rate of 0.5 mil per hour at 25° C. and of 1.0 mil per hour at 60° C. These experiments clearly indicate that elevated temperature and the use of a fluidized bed have a very beneficial effect on the dissolution rate.

*Example II*

The corrosion rate of various materials was determined at different temperature ranges both under fluidized-bed and stationary conditions. The materials tested were nickel, Monel and stainless steel 304. The operating conditions were the same as in Example I except that the temperature for the Monel experiment ranged between 25 and 115° C., while that for the runs with stainless steel 304 ranged between 55 and 115° C. The nickel experiment was carried out at room temperature. The corrosion rates, in mils per hour, were 0.3 for the nickel without fluidization and 1.8 with fluidization; for the Monel 0.5 without fluidization and 6.7 when a fluidized bed was used; and the corresponding values for the stainless steel 304 were 1.0 and 8.5. These experiments, too, clearly show the increase of solubility when a fluidized bed was used. They also suggest that higher temperatures yield an increased dissolution rate and perhaps also that stainless steel dissolves more easily than Monel and nickel.

*Example III*

Stainless steel 304 was corroded in an atmosphere of air at room temperature at a rate of 0.01 mil per hour when the hydrochloric acid concentration was 3% by weight and at a rate of 1.3 mils per hour when the hydrochloric acid concentration was 32% by weight.

It will be understood that the invention is not to be limited to the details given herein but that it may be modified within the scope of the appended claims.

The embodiments of the invention in which an exclusive property or privilege is claimed are defined as follows:

1. A process of dissolving stainless-steel claddings from fuel elements comprising said claddings and uranium-oxide-base nuclear fuel cores, said process comprising contacting said fuel elements while in an oxygen-containing gas-fluidized bed and at between 25 and 100° C. with liquid atomized aqueous hydrochloric acid whereby the cladding is dissolved, but the core remains unattacked.

2. The process of claim 1 wherein the fluidization gas is air.

3. The process of claim 1 wherein the fluidization gas is air enriched in oxygen.

4. The process of claim 1 wherein the fluidization gas is oxygen.

5. The process of claim 1 wherein the aqueous hydrochloric acid has a concentration of between 3 and 35% by weight.

References Cited by the Examiner
UNITED STATES PATENTS
3,089,751   5/1963   Beaver et al. _____ 23—14.5

BENJAMIN R. PADGETT, *Acting Primary Examiner.*

S. TRAUB, *Assistant Examiner.*